United States Patent [19]

Suzuki

[11] Patent Number: 5,178,072
[45] Date of Patent: Jan. 12, 1993

[54] GROUND COIL FOR MAGNETICALLY LEVITATED RAILWAY AND METHOD OF PRODUCING THE SAME

[75] Inventor: Masao Suzuki, Kokubunji, Japan

[73] Assignee: Railway Technical Research Institute, Tokyo, Japan

[21] Appl. No.: 786,207

[22] Filed: Oct. 31, 1991

[30] Foreign Application Priority Data

Nov. 1, 1990 [JP] Japan .................................. 2-293749

[51] Int. Cl.$^5$ .............................................. B60L 13/04
[52] U.S. Cl. .................................... 104/286; 104/294
[58] Field of Search ................ 104/286, 294, 281, 290

[56] References Cited

U.S. PATENT DOCUMENTS

| 4,380,617 | 4/1983 | Minchak et al. | 526/161 |
| 4,400,340 | 8/1983 | Klosiewicz | 264/328.6 |
| 4,426,502 | 1/1984 | Minchak | 526/172 |
| 4,913,059 | 4/1990 | Fujie et al. | 104/282 |

FOREIGN PATENT DOCUMENTS

| 0122508 | 9/1979 | Japan | 104/286 |
| 0122509 | 9/1979 | Japan | 104/286 |
| 0024402 | 1/1990 | Japan | 104/294 |
| 0178506 | 8/1991 | Japan | 104/281 |

Primary Examiner—Robert J. Oberleitner
Assistant Examiner—Mark T. Le
Attorney, Agent, or Firm—Nikaido, Marmelstein, Murray & Oram

[57] ABSTRACT

In order to produce a ground coil for a magnetically levitated railway, coils each composed of a conductor coiled in a plurality of turns are arranged in a metal mold, and a synthetic resin forming reactive liquid is injected and cured in the metal mold by reaction injection molding. Furthermore, a plurality of base coils are produced each composed of a coil conductor coiled in a plurality of turns in a desired shape, laid in two tiers and connected in series so as to form unit coils. Two unit coils are connected so that the winding directions of them are opposite to each other and guidance terminals are formed, thereby forming a pair of levitation and guidance coils. Two pairs of levitation and guidance coils are arranged on a single plane in a metal mold so that the positional relationship among the coils is constant, and a synthetic resin forming reactive liquid is injected and integrally cured by reaction injection molding.

3 Claims, 8 Drawing Sheets

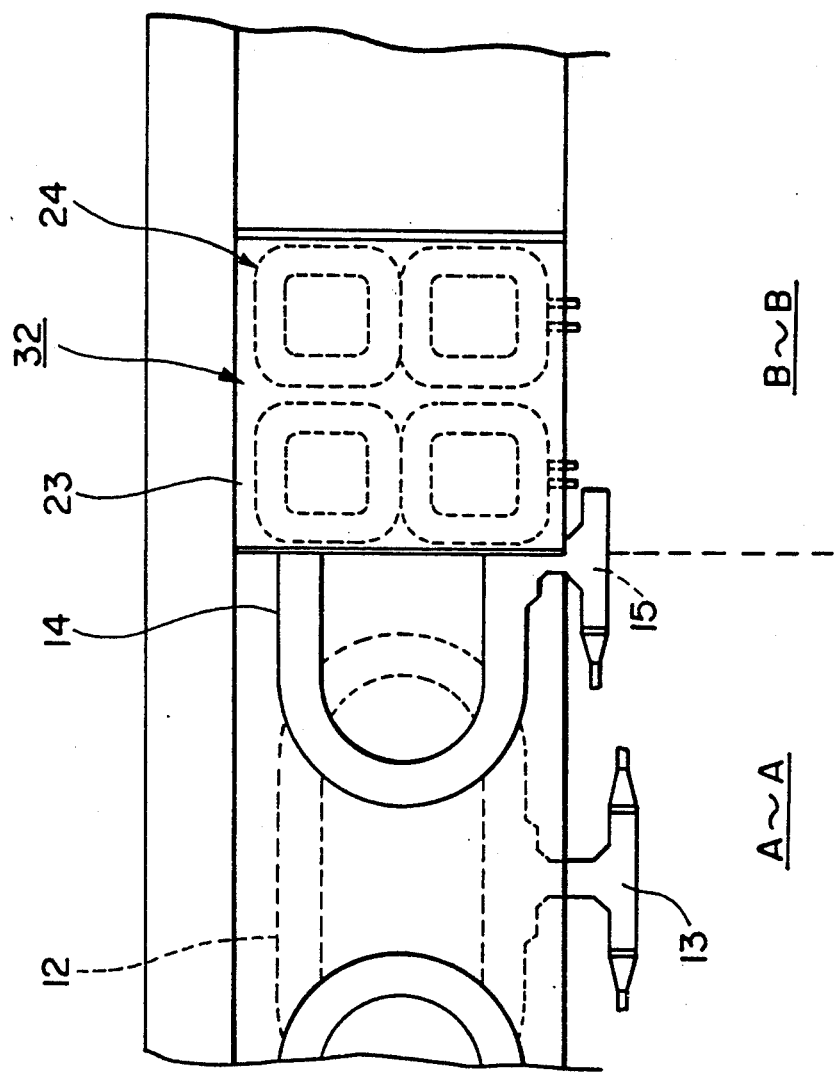
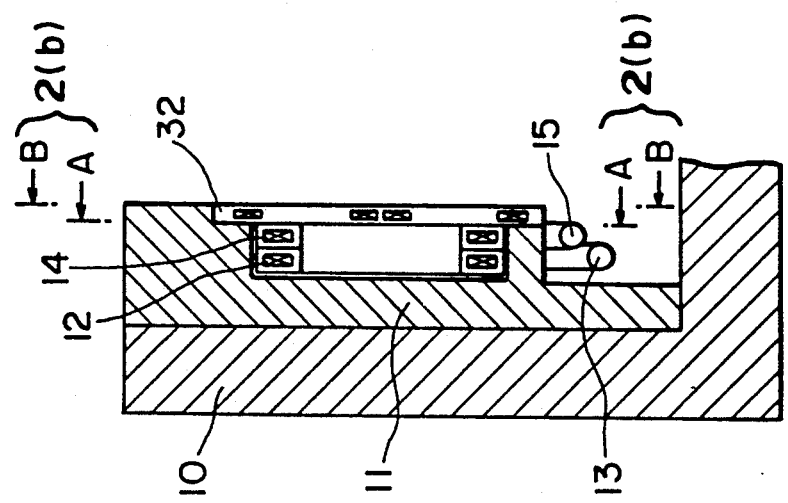

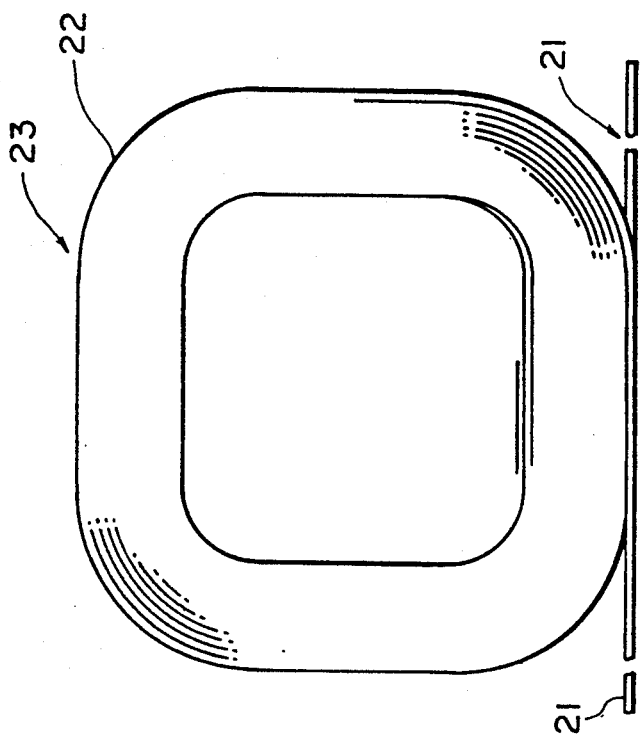 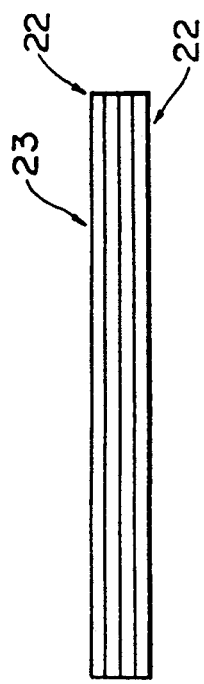
FIG.3(a) FIG.3(b) FIG.4(a) FIG.4(b)
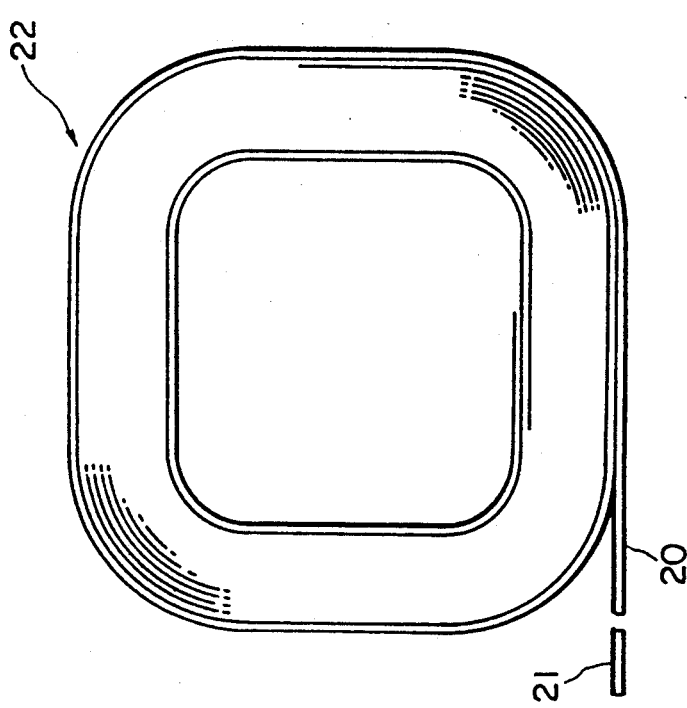 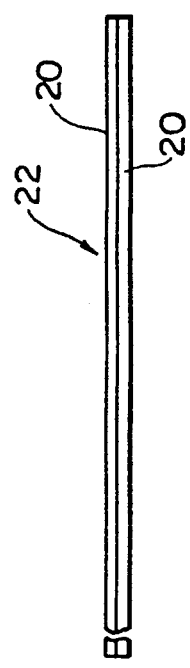

FIG.5(a)
FIG.5(c)
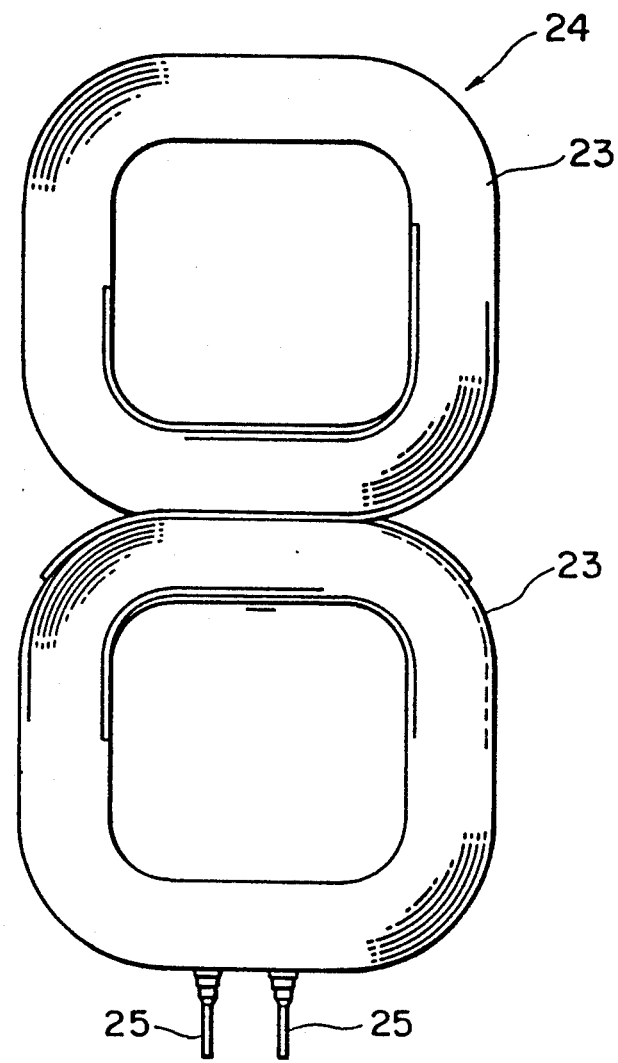
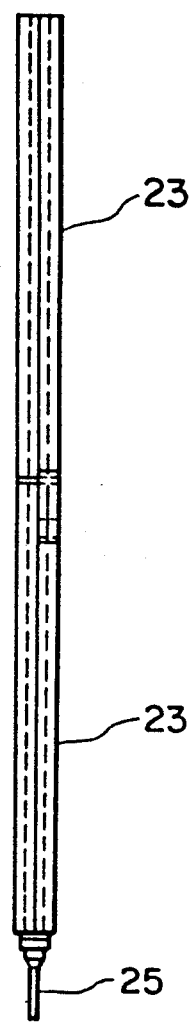
FIG.5(b)
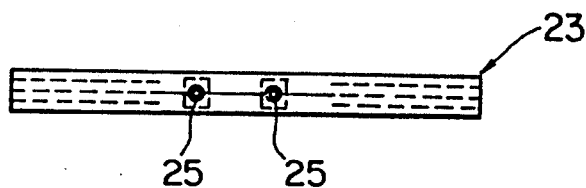

DEVELOPMENT

GROUND COIL FOR MAGNETICALLY LEVITATED RAILWAY AND METHOD OF PRODUCING THE SAME

BACKGROUND OF THE INVENTION

1. Field of the Invention

The present invention relates to a ground coil for a magnetically levitated railway, and more particularly to a levitation and guidance ground coil fixed to a side wall of a track.

2. Description of the Related Art

This kind of art is disclosed in, for example, in U.S. Pat. No. 4,913,059 to the applicant of the present invention.

FIG. 1 illustrates the connection and arrangement of such conventional ground electric coils.

Referring to FIG. 1, four unit coils 1 to 4 for levitation and guidance are arranged on the same side wall along the direction of travel of a levitated object. A levitating force is produced by connecting these coils 1 to 4 at levitation null-flux connecting portions 5 so that induced voltages due to linkage magnetic fluxes between the upper and lower coils counterbalance with each other when the levitated object runs. Furthermore, null-flux connecting wires 6 and 7 are also disposed between the opposing unit coils, that is, the coils 1 and 3 and the coils 2 and 4 so that induced voltages produced by the linkage magnetic fluxes counterbalance with each other.

Thus, the levitation and guidance coils serve the purposes of levitation and guidance independent of a propulsion conductor coil 9 which needs electricity from an outside power supply 8.

As described above, in the production of a ground coil for a magnetically levitated railway when large electrical insulating strength is not necessary, integral molding using a SMC (Sheet Molding Compound) in consideration of mass productivity and mechanical strength is popular. More specifically, the molding is carried out in the following procedures:

(1) A plurality of base coils are prepared on each of which a conductive wire is coiled in a desired shape in a plurality of turns. At this time, although it is natural that insulation be conducted on the wire, a preprocess is also necessary in preparation of subsequent impregnation or quenching. This preprocess means an operation necessary to perform temporary forming previous to actual molding, which is carried out, for example, in the following methods:

(a) In the case of temporary forming by impregnation, coils are bound by a glass tape which is excellent in permeability relative to impregnant resin and is strong in the pulling direction.

(b) In the case of temporary forming by quenching, wires and coils are bound by an insulating tape coated with a semicuring resin.

(2) The base coils are located in two tiers and connected in series by welding so as to form unit coils. At this time, a preprocess is also necessary in preparation of the subsequent impregnation or quenching.

(3) Two unit coils are connected so that the winding directions of them are opposite to each other and formed into a pair of levitation coils. When conductors of the unit coils are welded, guidance terminals are concurrently drawn out from welding points and levitation and guidance coils are produced. A preprocess is sometimes needed in preparation of the temporary forming to maintain an exact positional relationship between the upper and lower coils.

(4) In order to prevent the positional relationships between the wires of the coils and the coils from being changed by high pressure applied in molding of the coils, the temporary forming is carried out by resin impregnation or quenching previous to the molding.

(5) Two pairs of levitation and guidance coils are arranged on a single plane in a preheated metal mold in constant positional relationship.

(6) Molding materials are uniformly arranged in the metal mold so as to wrap the coils. At this time, it is necessary to take steps to prevent the coils from being displaced from respective predetermined positions.

(7) An upper lid is set on the metal mold, the molding materials are melted by heat and pressure, and then, integral molding is carried out by a thermosetting reaction.

However, the above conventional method of producing a ground coil has the following disadvantages:

(1) Since it is premised that the molding be carried out at high temperature under high pressure, equipment for heating and pressurizing the metal mold is necessary. In particular, when a large molded product is obtained, the equipment is enlarged.

(2) The metal mold is required to have a sufficient mechanical strength to withstand high temperature and high pressure, thereby increasing design and production costs.

(3) Since the coils are likely to be deformed by pressure in the molding, temporary forming by impregnation or quenching is necessary for the coils previous to actual molding.

(4) The preprocess of molding, that is, the positioning of the coils and the uniform arrangement of sheet molding materials are troublesome.

(5) Since a plurality of coils are integrally molded, it is likely that the relative positional relationship between the coils will change or that the arrangement of the molding materials will be made uneven.

(6) Since heat and pressure are applied from the periphery of the molding material through the metal mold, curing reaction gradually appears from the outer portion of the coils and thus inner stress is likely to be left.

(7) The curing and molding process takes a relatively long time.

(8) Since the specific gravity of the SMC material is relatively large, the weight of a finished integral coil including a plurality of coils is heavy. This has a bad influence on production and mounting operations.

(9) The molding material itself is highly expensive, and therefore, is not suitable for mass production.

SUMMARY OF THE INVENTION

An object of the present invention is to provide a method of producing a ground coil for a magnetically levitated railway which inexpensively and reliably produces a ground coil by reaction injection molding using a synthetic resin forming reactive liquid instead of a conventional method of injection molding, and a ground coil produced by the method.

In order to achieve the above object, in a method of the present invention of producing a ground coil for a magnetically levitated railway, conductor coils each composed of a wire in a plurality of turns are arranged in a metal mold, and a synthetic resin forming reactive liquid is injected and cured by reaction injection molding.

Furthermore, a plurality of base coils are produced each composed of a coil conductor coiled in a plurality of turns in a desired shape, laid in two tiers and connected in series so as to form unit coils. Two unit coils are connected so that the winding directions of them are opposite to each other and guidance terminals are formed, thereby forming a pair of levitation and guidance coils. Two pairs of levitation and guidance coils are arranged on a single plane in a metal mold so that the positional relationship among the coils is constant, and a synthetic resin forming reactive liquid is injected and integrally cured by reaction injection molding.

According to the present invention described above, (1) A plurality of base coils each composed of a coil conductor coiled in a plurality of turns in a desired shape are produced.

(2) The base coils are laid in two tiers and connected in series by welding so as to form unit coils.

(3) Two unit coils are connected so that the winding directions of them are opposite to each other, thereby forming a pair of levitation coils. When the conductors of the unit coils are welded, guidance terminals are concurrently drawn out from welding points and levitation and guidance coils are formed.

(4) Two pairs of levitation and guidance coils are arranged on a single plane in a metal mold so that the positional relationship among the coils is fixed.

(5) A synthetic resin forming reactive liquid is injected and integrally cured by reaction injection molding.

Furthermore, in a ground coil for a magnetically levitated railway, a plurality of base coils are produced each composed of a coil conductor coiled in a plurality of turns in a desired shape, laid in two tiers and connected in series so as to form unit coils. Two unit coils are connected so that the winding directions of them are opposite to each other and guidance terminals are formed, thereby forming a pair of levitation and guidance coils. Two pairs of levitation and guidance coils are arranged on a single plane in a metal mold so that the positional relationship among the coils is constant, and a synthetic resin forming reactive liquid is injected and integrally cured by reaction injection molding. Therefore, it is possible to simplify the coil molding process and to reduce the load on winding and assembling operations of coils in molding.

BRIEF DESCRIPTION OF THE DRAWING

FIG. 2(a) is a cross-sectional view showing the placement of a ground coil according to an embodiment of the present invention;

FIG. 2(b) is a partly cutaway front view of the ground coil;

FIG. 3(a) is a schematic top view of a base coil of the ground coil;

FIG. 3(b) is a schematic side view of the base coil of the ground coil;

FIG. 4(a) is a schematic top view of a unit coil of the ground coil;

FIG. 4(b) is a schematic side view of the unit coil of the ground coil;

FIG. 5(a) is a schematic top view of a levitation and guidance coil of the ground coil;

FIG. 5(b) is a schematic front view of the levitation and guidance coil of the ground coil;

FIG. 5(c) is a schematic side view of the levitation and guidance coil of the ground coil;

DESCRIPTION OF THE PREFERRED EMBODIMENT

Figure 1:
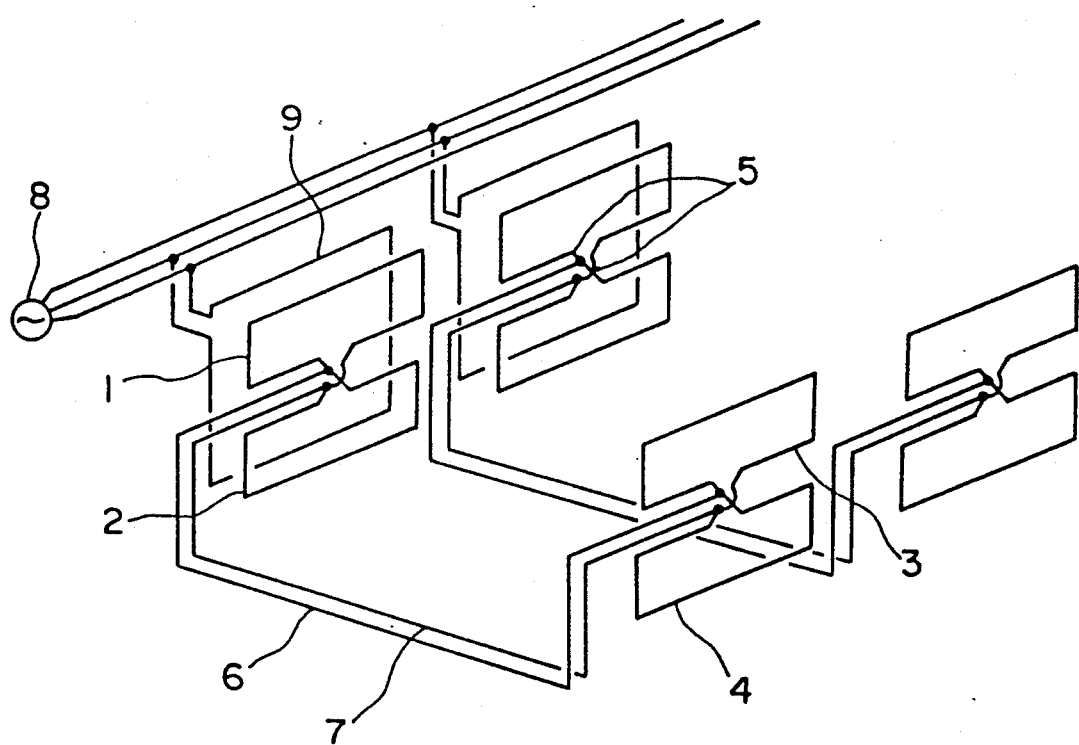
FIG. 1 is a view showing the connection and arrangement of ground electric coils according to the prior art.

An embodiment of the present invention will now be described in detail with reference to the accompanying drawings.

Referring to FIGS. 2(a) and 2(b), a ground coil fixing panel 11 is disposed on a side wall 10 of a track. A first propulsion coil 12 having a leading portion 13 for connecting coils, a second propulsion coil 14 having a leading portion 15 for connecting coils, and levitation and guidance coil 24, and an integral levitation and guidance coil 32 which is produced by reaction injection molding using a synthetic resin forming reactive liquid are mounted on the side wall 10. Numeral 23 denotes a unit coil (described below).

In particular, the levitation and guidance coil is not supplied with electricity from outside, can be easily insulated, and thus is suitable for the application of the present invention.

The production of a ground coil of the present invention will be specifically described.

As shown in FIG. 3(a), a spool (not shown) is set in the center of a coil to be produced. When the spool is being rotated, a wire 20 (for example, Al) having predetermined width and thickness is coiled around the spool in a plurality of turns, for example, twelve turns together with thin insulating paper 21 while conducting layer insulation. A wire on which insulation is conducted beforehand may be used as a coil conductor. In short, it is only necessary that the coil conductor be insulated in order to prevent layer short. Two coils thus formed are laid one on top of the other through an insulating sheet (not shown) as shown in FIG. 3(b), and connected in series. In other words, two wires are coiled in parallel (12 turns×2) in two tiers, thereby forming a base coil 22. Although two wires are coiled in parallel in the above description in order to reduce the loss of eddy current caused in the wires when a levitated running object passes, one wire whose cross-sectional area is twice as large as that of each of the above wires may be coiled.

Subsequently, a plurality of base coils 22 are produced in the manner described above and laid in two tiers through an insulating sheet (not shown) as shown in FIGS. 4(a) and 4(b). In short, the coils are arranged in four tiers. The base coils 22 are connected in series by welding, thereby obtaining a unit coil 23 composed of wires laid in two tiers in each of which the wire is coiled in twelve turns, that is, the wire is coiled in twenty-four turns.

Figure 6:
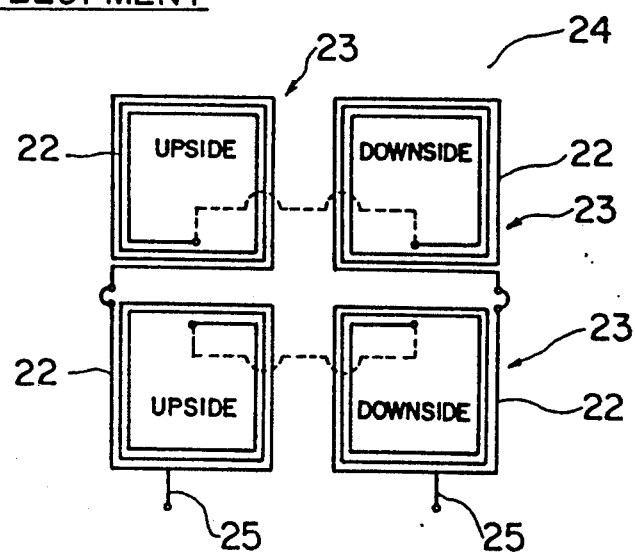
FIG. 6 is a wiring development of the levitation and guidance coil of the ground coil.

Then, the unit coils 23 thus formed are connected so that the winding directions thereof are opposite to each other, thereby forming a pair of levitation coils. When the conductors of the unit coils 23 are welded, guidance terminals 25 are drawn out from welding points so as to obtain a levitation and guidance coil 24. In other words, as shown in FIGS. 5(a)–5(c), the unit coils 23 are vertically arranged on the side wall 10 of the track (shown in FIG. 2(a)–2(b)), wiring is performed as shown in the development of FIG. 6, and the ends of the unit coils 23 are connected so as to short-circuit, thereby obtaining the levitation and guidance coil 24. The levitation and guidance coils 24 arranged opposite to the side wall 10 of the track are null-flux connected through the guidance terminals 25.

Figure 7:
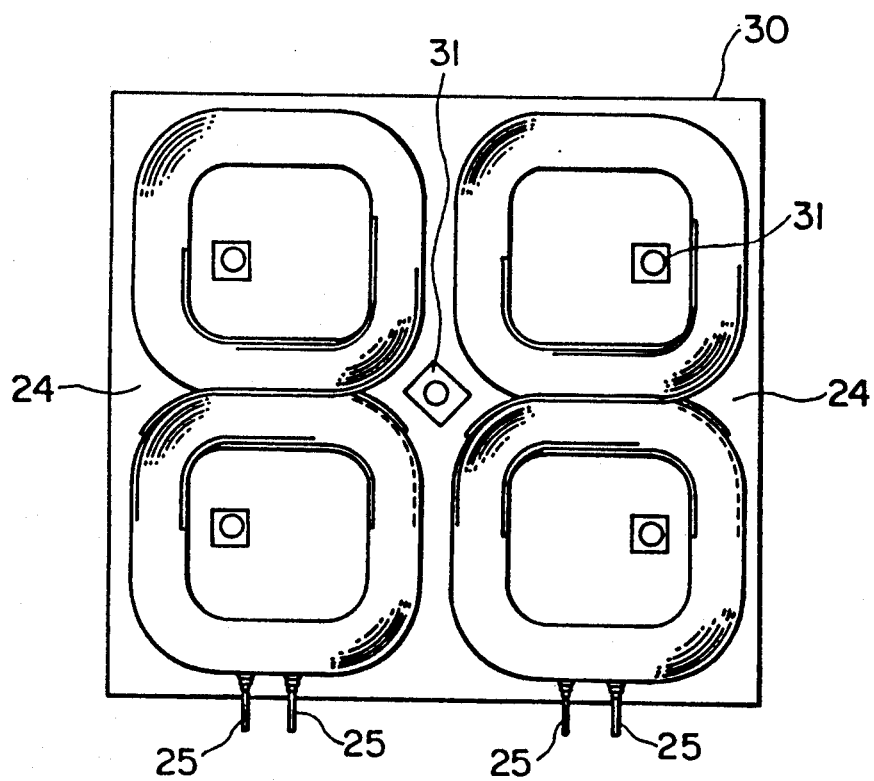
FIG. 7 is a view showing the arrangement of the levitation and guidance coils when the ground coil is molded.

Two pairs of levitation and guidance coils 24 are arranged on a single plane in a metal mold 30 so that the positional relationship among the coils is fixed as shown in FIG. 7. In this case, the coils 24 are temporarily fixed so that the coils 24 are not moved even if the metal mold 30 is tilted after an upper lid is set on the metal mold 30.

Furthermore, numeral 31 in FIG. 7 denotes concave portions where heads of bolts for attaching the levitation and guidance coils 24 onto the side wall 10 of the track are positioned.

In this state, while the metal mold 30 is tilted and gas in the metal mold 30 is emitted from the top, a synthetic resin forming reactive liquid is injected from the bottom by reaction injection molding and integrally cured.

The reaction injection molding will now be described in detail. A liquid material (monomer) is directly injected into a mold so as to form a ground coil for a magnetically levitated railway. In principle, the reaction injection molding is:

(1) Process for polymerizing by ring opening polymerization of a norbornene-type monomer, or a mixture thereof, with or without at least one other polymerizable monomer, in presence of an alkylaluminum halide cocatalyst and an organoammonium molybdate or tungstate catalyst that is soluble in a hydrocarbon reaction solvent and the norbornenetype monomer (see, for example, U.S. Pat. Nos. 4,380,617 and 4,426,502).

(2) Process for combining a catalyst-contained solvent containing DCPD (dycyclopentadiene) and an activatorcontained solvent and then immediately injecting the combination into a metal mold (see, for example, U.S. Pat. No. 4,400,340).

Figures 8A, 8B:
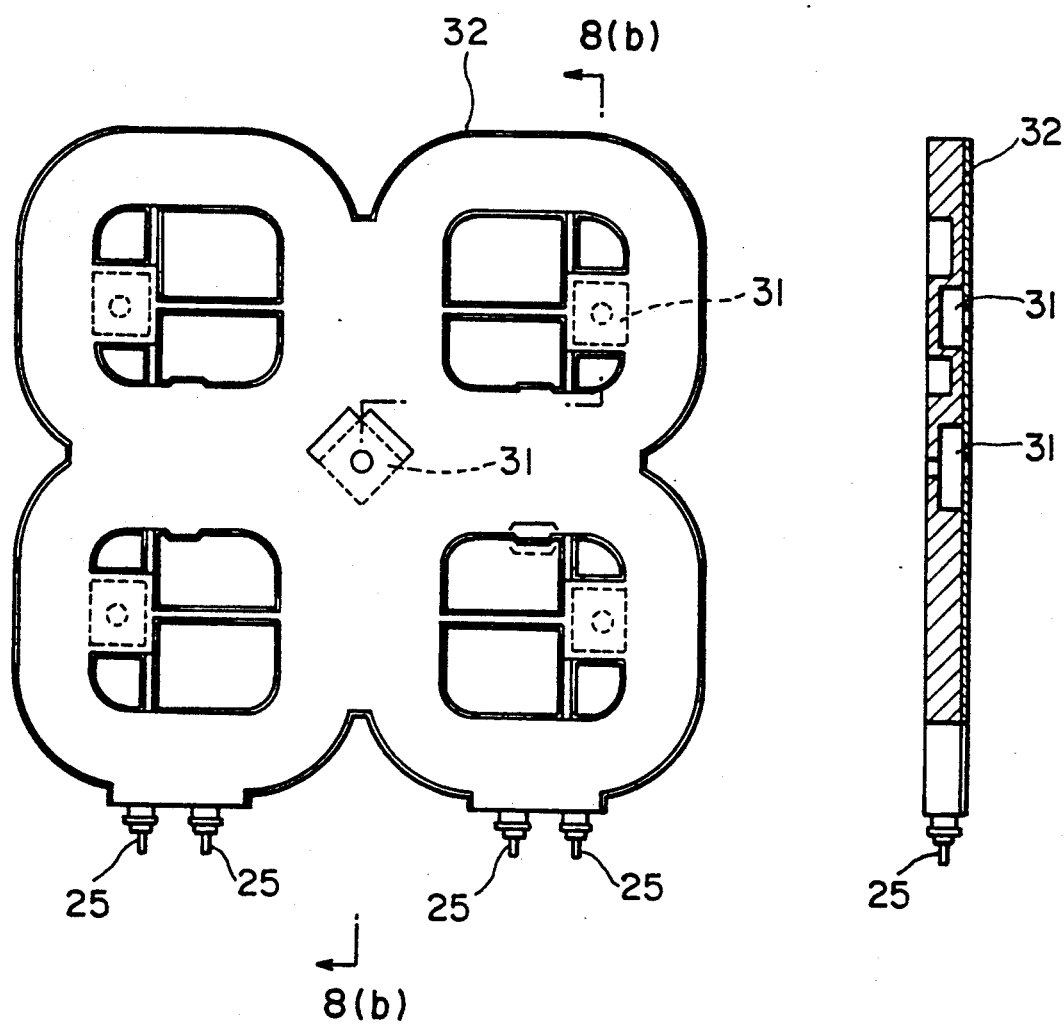
FIG. 8(a) is a schematic plan view of an integral levitation and guidance coil obtained by ground coil molding.
FIG. 8(b) is a perspective view of teh levitation and guidance coil obtained by the ground coil molding.

FIG. 8 illustrates a levitation and guidance coil integrally formed by the reaction injection molding.

Thus, the levitation and guidance coil having high elasticity and large impact strength can be inexpensively and easily produced.

Since the levitation and guidance is not supplied with electricity from outside, it is suited to be integrally formed by the above reaction injection molding.

Figure 9:
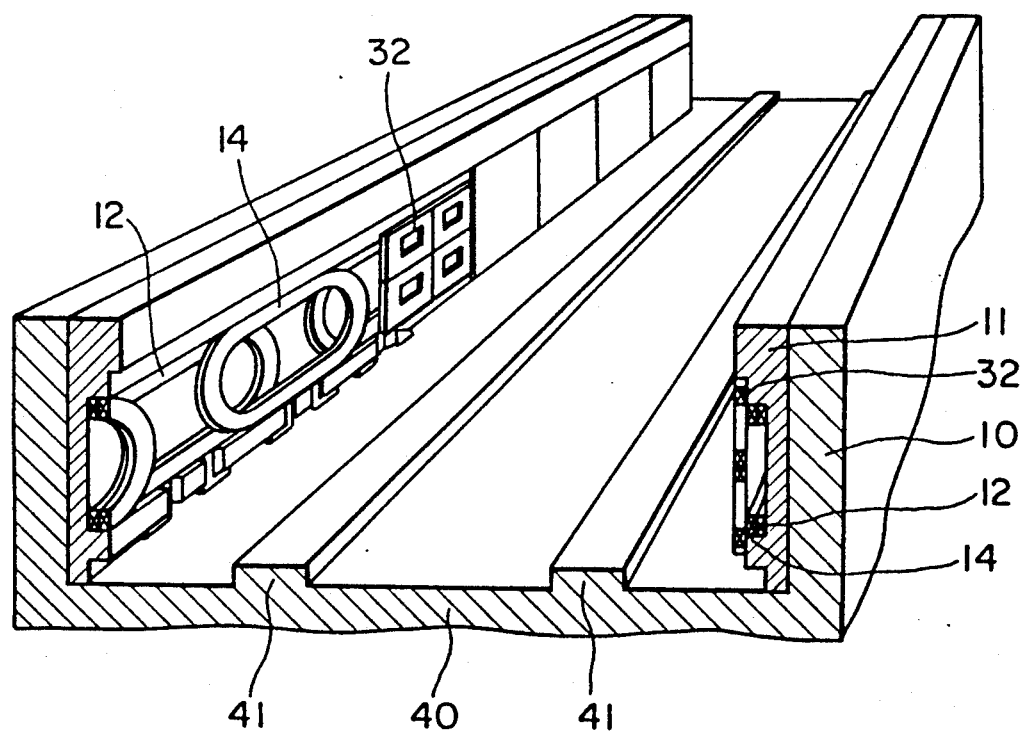
FIG. 9 is a perspective view of a track for a magnetically levitated railway on which the ground coils of the present invention are arranged.
Figure 10:
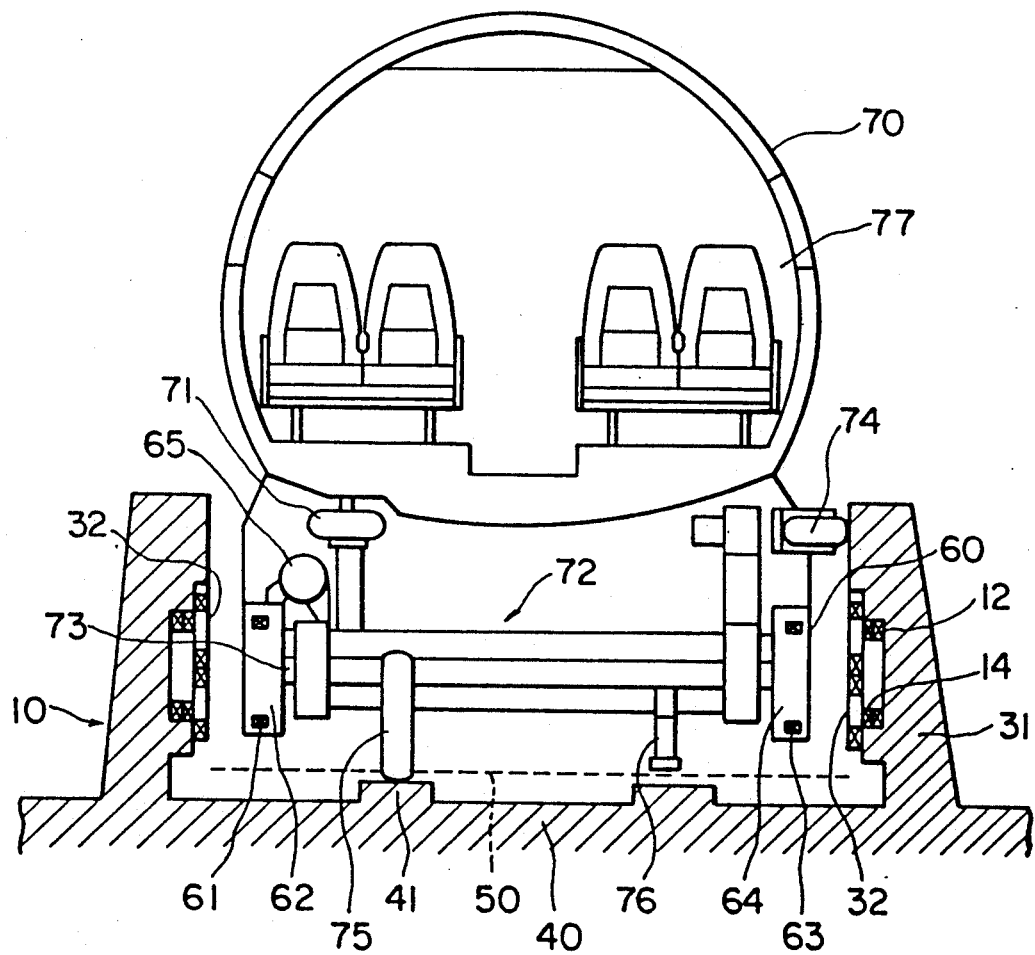
FIG. 10 is a general cross-sectional view of the magnetically levitated railway.

Levitation and guidance ground coils, thus produced, are arranged as shown in FIGS. 9 and 10.

In other words, the levitation and guidance ground coils 32 are spread all over the side wall 10 of the track.

Furthermore, since the concave portions 31 in each of which bolts for mounting the ground coil 32 on the side wall 10 of the track are positioned are formed in a plurality of portions of the levitation and guidance ground coil 32, in this embodiment, in the center and on the four corners of the ground coil 32, the heads of the bolts are fitted in the concave portions 31, and do not protrude from the ground coil 32. Therefore, even if a magnetically levitated vehicle passes at very high speed, air noises (sounds arising when a projecting object runs through the air) do not arise.

Referring to FIG. 9, the components 10 through 32 are described above. Numerals 40 and 41 denote a track and rails, respectively.

In a vehicle shown in FIG. 10, a truck 72 is formed at the bottom of a vehicle body 70 through an air spring 72, and a superconducting magnet 60 having a superconducting coil 63, cryostat 64, a helium tank 65 and so on is mounted on a truck frame 73. Furthermore, a supplementary guide device 74, a supplementary support device 75, an emergency landing device 76 and so on are mounted. Numeral 50 denotes a null-flux wire.

As illustrated, the levitation and guidance ground coils 32 are arranged on both side walls 10 and 10 of the track. The vehicle is levitated and guided by opposing the superconducting magnet 60 on the vehicle to the ground coils 32. Propulsion of the vehicle is performed by the propulsion ground coils 12 and 14.

Although the levitation and guidance coil is mainly mentioned in the above embodiment, the present invention is applicable to a general propulsion coil if the coil is a low-powered propulsion coil, or according to the selection of a synthetic resin forming reactive liquid or the conditions of molding.

As described above, the present invention has the following advantages:

(1) It is only necessary to insulate coil conductors when the coil conductors are coiled, and therefore, a pretreatment for impregnation or quenching necessary for temporary fixing of the conductors can be omitted.

(2) Since molding is possible at ordinary temperature under normal pressure, the equipment necessary for the molding can be simplified and the production cost of a metal mold can be reduced drastically.

(3) An impregnation or quenching process for temporary coil molding in preparation of pressurization in actual molding can be omitted.

(4) Since molding is possible under normal pressure, an object to be molded is not overloaded and the positional relationships between wires and coils are not likely to change. Therefore, little unevenness of a molding material is caused by molding.

(5) The pre-treatment of molding is simplified, and since the curing time of a synthetic resin forming reactive liquid is relatively short, the time needed to cure and mold a coil can be greatly shortened.

(6) Since the specific gravity of the molding material is low, the weight of a finished integral coil is made light, and thus its operability can be improved.

(7) The synthetic resin forming reactive liquid as a molding material is relatively inexpensive, resulting in lower cost of the coil.

(8) Since the reactive liquid to be injected has low viscosity, molding is possible even if an insertion has a complicated shape.

(9) It is possible to simplify the coil molding process, and to reduce the load on winding and assembling operations of coils in molding.

(10) In particular, in the case of a levitation and guidance coil, no electricity is supplied from outside and insulation is easily performed. Therefore, the levitation and guidance coil is suitable for the application of the present invention.

What is claimed is:

1. A method of producing a ground coil for a magnetically levitated railway, comprising the steps of:
   (a) producing a plurality of base coils each composed of a conductor coiled in a plurality of turns in a desired shape;
   (b) laying said base coils in two tiers and connecting said base coils in series so as to form unit coils;
   (c) connecting two unit coils so that winding directions thereof are opposite to each other, forming guidance terminals, and forming a pair of levitation and guidance coils which are not applied with electricity from an outside power supply;
   (d) arranging two pairs of said levitation and guidance coils on a single plane in a metal mold so that positional relationship among said coils is constant; and
   (e) injecting a synthetic resin forming reactive liquid under normal temperature and normal pressure by reaction injection molding and integrally curing said reactive liquid.

2. A means for producing a ground coil for a magnetically levitated railway, comprising:
   (a) means for producing a plurality of base coils each composed of a conductor coiled in a plurality of turns in a desired shape;
   (b) means for laying said base coils in two tiers and for connecting said base coils in series so as to form unit coils;
   (c) means for connecting two unit coils so that winding directions thereof are opposite to each other so as to form a pair of levitation an guidance coils, which are not applied with electricity from an outside power supply, having guidance terminals;
   (d) means for arranging two pairs of said levitation and guidance coils on a single plane in a metal mold so that the positional relationship among said coils is constant; and
   (e) means for injecting a synthetic resin forming reactive liquid under normal temperature and normal pressure by reaction injection molding and for integrally curing said reactive liquid with said levitation and guidance coils.

3. A means for producing a ground coil according to claim 2, further comprising a means for arranging a plurality of said integral levitation and guidance coils in order on both side walls of a track.

* * * * *